United States Patent
Hu et al.

(10) Patent No.: US 7,809,454 B2
(45) Date of Patent: Oct. 5, 2010

(54) METHOD AND APPARATUS FOR SIMULATING COMPOSITE PANEL MANUFACTURING

(75) Inventors: Charles Yuanxin Hu, Newcastle, WA (US); David Edward Cooper, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 174 days.

(21) Appl. No.: 11/856,372

(22) Filed: Sep. 17, 2007

(65) Prior Publication Data

US 2009/0076638 A1   Mar. 19, 2009

(51) Int. Cl.
G06F 19/00 (2006.01)
(52) U.S. Cl. .................................... 700/97
(58) Field of Classification Search ........... 700/97, 700/98, 118, 119, 122
See application file for complete search history.

(56) References Cited

U.S. PATENT DOCUMENTS

| | | | | |
|---|---|---|---|---|
| 5,249,120 | A * | 9/1993 | Foley | 705/1 |
| 6,240,333 | B1 * | 5/2001 | McGee | 700/207 |
| 6,799,081 | B1 | 9/2004 | Hale et al. | |
| 6,823,342 | B2 * | 11/2004 | Wallen et al. | 707/102 |
| 6,900,547 | B2 * | 5/2005 | Polk, Jr. et al. | 257/777 |
| 7,010,544 | B2 * | 3/2006 | Wallen et al. | 707/102 |
| 7,478,780 | B2 * | 1/2009 | Wilding et al. | 244/119 |
| 2004/0026025 | A1 * | 2/2004 | Sana et al. | 156/256 |
| 2005/0039842 | A1 * | 2/2005 | Clark et al. | 156/173 |
| 2005/0247396 | A1 * | 11/2005 | Oldani et al. | 156/173 |
| 2006/0073309 | A1 | 4/2006 | Hogg | |
| 2007/0106407 | A1 | 5/2007 | Drumheller et al. | |
| 2007/0106418 | A1 | 5/2007 | Hagen et al. | |
| 2007/0144676 | A1 | 6/2007 | Tang et al. | |
| 2007/0150087 | A1 | 6/2007 | Tang et al. | |

FOREIGN PATENT DOCUMENTS

EP  1804146 A  7/2007

OTHER PUBLICATIONS

Ashizawa et al.; "Manufactruing Tachnology for Polymer Composite Structures "; Apr. 1994; JTEC; chapter 1; pp. 1-20.*
Guillermin, Olivier; "Advanced Composite Engineering using MSC. Pantran and FiberSIM"; Jul. 20, 2004; Composite Design Technologies; pp. 1-15.*
U.S. Appl. No. 11/352,274, filed Feb. 13, 2006, Johnson et al.
Olsen et al., "Automated composite tape lay-up using robotic devices", Proceedings of the International Conference on Robotics and Automation, Atlanta, May 1993, pp. 291-297.

* cited by examiner

*Primary Examiner*—Albert DeCady
*Assistant Examiner*—Chad Rapp
(74) *Attorney, Agent, or Firm*—Yee & Associates, P.C.; Sean Casey

(57) ABSTRACT

A method and apparatus for managing production of a composite part. A three dimensional digital part definition is received for the composite part. A plurality of layers for the composite part is generated using the digital part definition with respect to a set of performance variables for an automated material placement system. A time needed to form the plurality of layers for the composite part to form a result and a cost ratio of production rate are identified. Production of the composite part is managed using the result.

22 Claims, 6 Drawing Sheets

| NEW OVERTRIVEL SHEET INPUT: | | | | | | | |
|---|---|---|---|---|---|---|---|
| NUMBER OF GANTRIES | 1 | 2 | 2 | 2 | 4 | 4 | |
| NUMBER OF HEADS | 1 | 4 | 8 | 12 | 8 | 16 | |
| 0 DEGREES | 0 | 52 | 114 | 156 | 175 | 238 | |
| 45 DEGREES | 0 | 52 | 80 | 100 | 114 | 144 | OVER TRAVEL DISTANCE IN INCHES |
| -45 DEGREES | 0 | 60 | 180 | 300 | 60 | 180 | |
| 90 DEGREES | 0 | 31 | 100 | 170 | 31 | 132 | |
| COST ($M) | 6.8 | 10.4 | 14 | 17 | 15.6 | 22.8 | |

LOWER PANEL COMPARISON

| | FROM CTLM DATA | | 816 HEAD TRAVEL LENGTH WITH LAYUP SPEED | 818 SIMULATION RESULTS 820 | | 822 |
|---|---|---|---|---|---|---|
| | TAPE USED IN PART | NC PROGRAM | | LAYUP TIME WITH SPEED 200 IN/MIN | LAYUP TIME WITH SPEED 230 IN/MIN | LAYUP TIME WITH SPEED 250 IN/MIN |
| HEAD TRAVEL (ft) | 83161.37 | | 99487.02 | | | |
| PROCESS TIME (hr) | | 136.71 | | 149.47 | 136.53 | 129.63 |
| TAPE WEIGHT (lb) | 2553.05 | | | | | |
| PRODUCTION RATE (lb/hr) | | 18.67 | | 17.08 | 18.70 | 19.69 |
| TIME DIFFER (%) | | | | 9.33% | -0.13% | -5.18% |
| PRODUCTION RATE DIFFER (%) | | | | -8.54% | 0.13% | 5.46% |

*FIG. 8*

METHOD AND APPARATUS FOR SIMULATING COMPOSITE PANEL MANUFACTURING

BACKGROUND INFORMATION

1. Field

The present disclosure relates generally to manufacturing components and in particular to a method and apparatus for predicting processing times and capital cost for laying down tape on a composite component. Still more particularly, the present disclosure relates to a computer implemented method, apparatus, and computer usable program code for simulating a layout process for a composite component.

2. Background

Aircraft are being designed and manufactured with greater and greater percentages of composite materials. Some aircraft may have more than fifty percent of their primary structure made from composite materials. Composite materials are used in aircraft to decrease the weight of the aircraft. This decreased weight improves payload capacities and fuel efficiencies. Further, composite materials also may provide improved corrosion and fatigue resistance for various components in an aircraft.

Composite materials are tough, light-weight materials, created by combining two or more dissimilar components to create a component with stronger properties than the original materials. Composite materials are typically non-metal materials. For example, a composite may include fibers and resins. The fibers and resins may be combined by curing or heating these components to form a cured product for the composite material.

In constructing composite components, such as a wing or fuselage, machines are used to build these components. For example, when building a wing panel, machines are used to lay-down composite materials, such as tape and fabric. The thickness of a layer of tape may be typically 7.5/1000 inches for each layer. The stack of composite materials is typically laid-down to around 0.5 inches. With this type of lay-down of materials, different orientations may occur for different materials and different layers to obtain the desired or optimal shape, strength, and durability for a component.

The amount of time needed for laying down materials for a component, such as a wing panel, may vary between different machines, different configurations of machines, and their cost. Further, the lay-down time for a particular component may change if the orientation of components, such as fabric or tape, changes. Further, the amount of time needed to lay-down materials for a composite wing panel may change if the thickness changes. These types of changes may vary the processing time needed to manufacture the different composite components for an aircraft.

SUMMARY

The advantageous embodiments provide a computer implemented method, apparatus, and computer usable program code for managing production of a composite part. A digital part definition is received for the composite part. A plurality of layers is generated for the composite part is generated using the digital part definition with respect to a set of performance variables for an automated material placement system. A time needed to form the plurality of layers for the composite part to form a result is identified. Production of the composite part is managed using the result.

In another advantageous embodiment, a computer program product contains computer usable program code to manage production of a composite part. The computer program product includes computer usable program code for receiving a digital part definition for the composite part. The computer program product has computer usable program code that generates a plurality of layers for the composite part using the digital part definition with respect to a set of performance variables for an automated material placement system. The computer usable program code is present to identify a time needed to form the plurality of layers for the composite part to form a result. The computer program product has computer usable program code for managing production of the composite part using the result.

In yet another advantageous embodiment, a data processing system comprising a bus; a communications unit connected to the bus; a storage device connected to the bus, wherein the storage device includes computer usable program code; and a processor unit connected to the bus. The processor unit executes the computer usable program code to receive a digital part definition for the composite part. The processor unit also executes the computer usable program code to generate a plurality of layers for the composite part using the digital part definition with respect to a set of performance variables for an automated material placement system. The processor unit executes the computer usable program code to identify a time needed to form the plurality of layers for the composite part to form a result. The process unit also may execute the computer usable program code to manage production of the composite part using the result.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present disclosure when read in conjunction with the accompanying drawings, wherein:

FIG. 8 is a diagram illustrating results in accordance with an advantageous embodiment;

DETAILED DESCRIPTION

Figure 1:
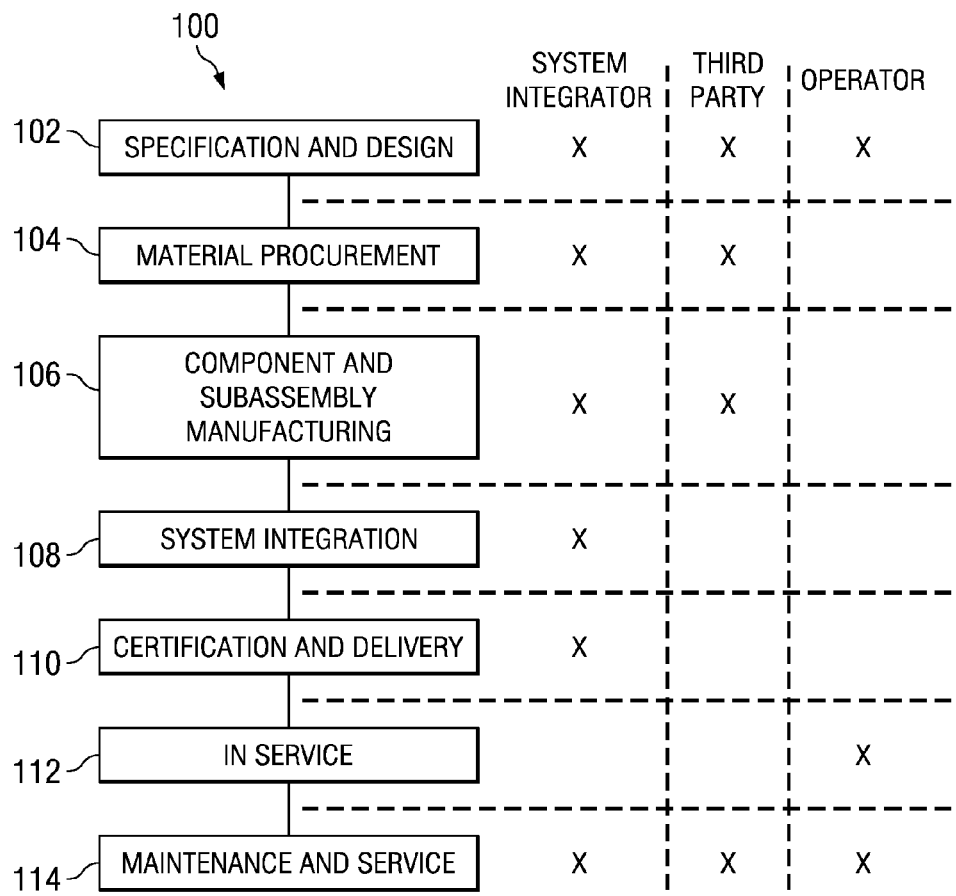
FIG. 1 is a diagram of an aircraft manufacturing and service method in which an advantageous embodiment may be implemented.
Figure 2:
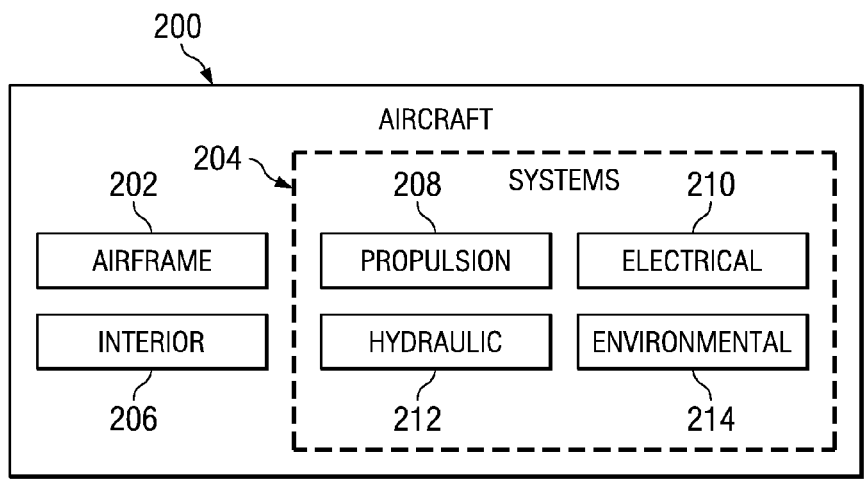
FIG. 2 is a schematic diagram of an aircraft which may be manufactured using processes in accordance with an advantageous embodiment.

Referring more particularly to the drawings, embodiments of the disclosure may be described in the context of aircraft manufacturing and service method 100 as shown in FIG. 1 and aircraft 200 as shown in FIG. 2. During pre-production, aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator as indicated by the "X" in the grid to the right of the flow diagram of FIG. 1. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

As shown in FIG. 2, aircraft 200, produced by aircraft manufacturing and service method 100, may include airframe 202 with plurality of systems 204 and interior 206. Examples of systems 204 include one or more of propulsion system 208, electrical system 210, hydraulic system 212, and environmental system 214.

Apparatus and methods embodied herein may be employed during any one or more of the stages of production and aircraft manufacturing and service method 100 in FIG. 1. For example, components or subassemblies corresponding to component and subassembly manufacturing 106 may be fabricated or manufactured in a manner similar to components or subassemblies produced while aircraft 200 is in service. Also, one or more apparatus embodiments, method embodiments, or a combination thereof may be utilized during production stages for component and subassembly manufacturing 106 and system integration 108 in FIG. 1, for example, by substantially expediting assembly of or reducing the cost of aircraft 200. Similarly, one or more of apparatus embodiments, method embodiments, or a combination thereof may be utilized while aircraft 200 is being manufactured, such as, for example, and without limitation, component and subassembly manufacturing 106 in FIG. 1.

The different advantageous embodiments provide a method, apparatus, and computer usable program code for managing production of a composite part. A digital part definition is received for a composite part. Layers for the composite part are generated using the digital definition with respect to a set of performance parameters for an automatic material placement system. A time needed to form the layers for the composite part is identified to form a result. Production of the composite part is managed using the result.

Figure 3:
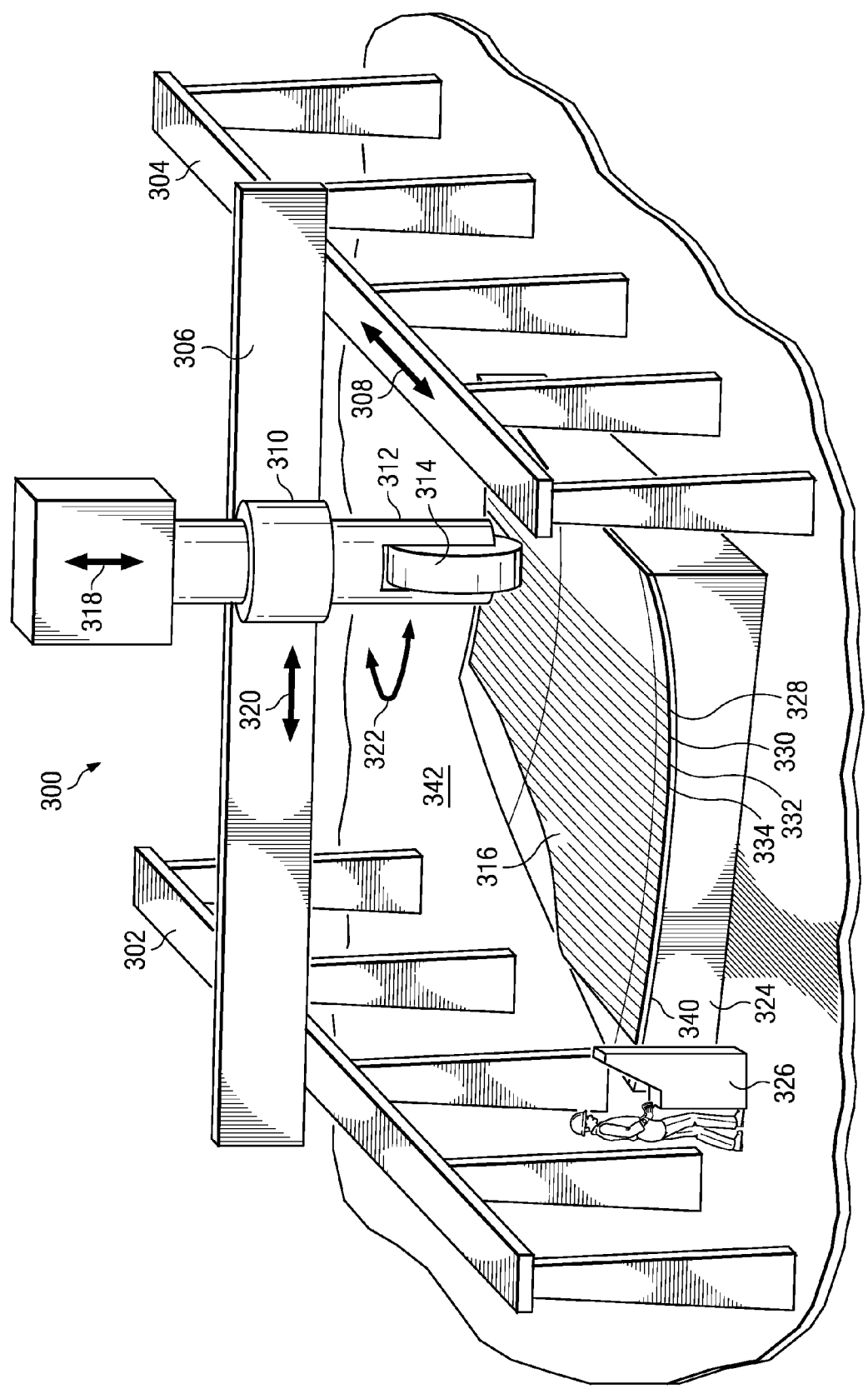
FIG. 3 is a diagram illustrating an example of an automated material placement system in accordance with an advantageous embodiment.

Turning now to FIG. 3, a diagram illustrating an example of an automated material placement system is depicted in accordance with an advantageous embodiment. In these examples, the automated material placement system is a set of material placement machines that lay down materials for a composite part. The set of material placement machines may be one or more machines. Also, the set of material placement machines may be all of the same type of machine or may include different types of machines. For example, automated material placement system 300 may include a machine to lay down tape and a machine to lay down fabric for a composite part. The system may have two machines in which one machine lays down tape and the other machine lays down fabric. The different embodiments any be applied to any type of system that comprises a set of machines or devices that lay down materials for a composite part.

In this example, automated material placement system 300 is an automated prepreg lamination machine that includes a single machine used to lay down prepreg tape to form composite parts. Of course, depending on the particular implementation, multiple automated prepreg lamination machines or other types of machines may be used. Automated material placement system 300 is used to lay down tape in this example. In particular, the tape is a prepreg tape in which resin and curing agent mixtures are impregnated into the tape. This type of tape is also referred to as a prepreg.

As depicted, automated material placement system 300 includes support rails 302 and 304. These support rails support bridge 306, which may be moved forward and backward along the direction of arrow 308. Further, bridge 306 includes arm 310 which holds tape head 312. Tape head 312 hold tape 314, which is used to lay-down layers of tape 314 to create composite part 316.

Arm 310 may be moved up and down along the direction of arrow 318 as well as left and right along the direction of arrow 320, in these examples. An additional movement that is provided in automated material placement system 300 is head rotation for tape head 312. Tape head 312 may be rotated as indicated along the direction of arrow 322.

In this example, tool 324 provides a form on which composite part 316 is laid down using tape 314. The movement of bridge 306 and arm 310 is controlled through controller 326 in these examples.

Automated material placement system 300 may be implemented using various currently systems. An example of a material placement machine that that may be used in automated material placement system 300 is M. Torres layup, which is a tape layer machine available from M. Torres. Another example is Access-Atlas which is a composite working machine available from Forest-Liné. Yet another example of a machine that may be used is an Ingersoll Automated Tape Lamination Machine (ATLM), which is available from Ingersoll Machine Tools, Inc.

Composite part 316 is created by laying down a number of layers of tape 314. The orientation of tape 314 on tool 322, in these examples, is shown in one direction. Of course, the orientation of tape 314 may be changed along different angles at the different layers of composite part 316 are laid up onto tool 322. Further, as composite part 316 could be formed, different tape widths and different tape thicknesses and types also may be used for different layers within composite part 316.

In laying down tape 314 on to tool 322 to form composite part 316, each layer is formed by laying down tape 314 next to each other or with some overlap such as shown with plies 328, 330, 332, and 334. These plies are also referred to as courses. The plies are the lines of tape 314 laid down on tool 322. Plies 328, 330, 332, and 334 are examples of some of the courses formed by laying down tape 314 to create a layer for composite part 316.

The width of each one of these plies is referred to as a ply width or a course width, in these examples. The plies illustrated for composite part 316 may be laid down in a number of different ways. For example, tape head 312 lays tape 314 for ply 328 starting at edge 340 and ending at edge 342. Tape head 312 may then rotate 180 degrees and then lay tape 314 for ply 330 starting at edge 342 moving towards edge 340. When edge 340 is reached, the next ply starts at edge 340. Alternatively, tape head 312 may be moved back to the starting point of the prior ply at edge 340 such that each ply starts at edge 340.

The illustrative examples are directed towards the laying down of tape to illustrate the principles of some of the different embodiments. These examples, however, are not meant to limit the materials or type of machines used to place materials for composite parts in different embodiments. The different advantageous embodiments may be applied to any type of machine or composite material used in a process to form a composite part. For example, the different embodiments may also be applied to the laying down of composite fabrics, such as fiber glass or prepreg fabric.

The different embodiments also may be applied to the laying down of combinations of composite materials. For example, the different advantageous embodiments may be applied to laying down tapes made of different types of materials, tapes of different widths, tape and fabric, or other combinations of composite materials with different characteristics.

Figures 4, 7:
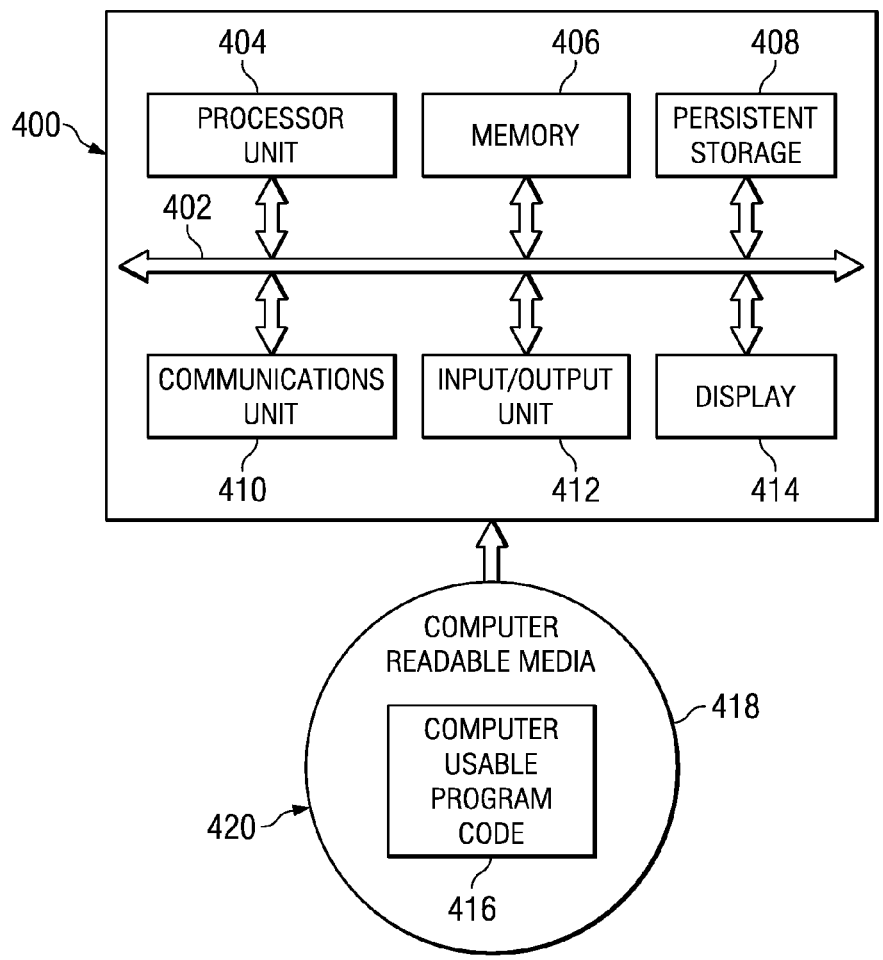
FIG. 4 is a schematic diagram of a data processing system in accordance with an advantageous embodiment.
FIG. 7 is an example of another mechanism used to enter performance parameters in accordance with an advantageous embodiment.

Turning now to FIG. 4, a diagram of a data processing system is depicted in accordance with an advantageous embodiment. In this example, data processing system 400 may be used to perform simulations of laying down tape to form a composite part, such as composite part 316 in FIG. 3. These simulations may be used to manage the production of composite parts. In this example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multiprocessor core, depending on the particular implementation. Further, processor unit 404 may be implemented using one or more heterogeneous processor systems in which a main processor is present with secondary processors on a single chip. As another illustrative example, processor unit 404 may be a symmetric multiprocessor system containing multiple processors of the same type.

Memory 406, in these examples, may be, for example, a random access memory. Persistent storage 408 may take various forms, depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard and mouse. Further, input/output unit 412 may send output to a printer. Display 414 provides a mechanism to display information to a user.

Instructions for the operating system and applications or programs are located on persistent storage 408. These instructions may be loaded into memory 406 for execution by processor unit 404. The processes of the different embodiments may be performed by processor unit 404 using computer implemented instructions, which may be located in a memory, such as memory 406. These instructions are referred to as computer usable program code or computer readable program code that may be read and executed by a processor in processor unit 404.

The computer readable program code may be embodied on different physical or tangible computer readable media, such as memory 406 or persistent storage 408.

Computer usable program code 416 is located in a functional form on computer readable media 418 and may be loaded on to or transferred to data processing system 400. Computer usable program code 416 and computer readable media 418 form computer program product 420, in these examples. In one example, computer readable media 418 may be, for example, an optical or magnetic disc that is inserted or placed into a drive or other device that is part of persistent storage 408 for transfer onto a storage device, such as a hard drive that is part of persistent storage 408. Computer readable media 418 also may take the form of a persistent storage, such as a hard drive or a flash memory that is connected to data processing system 400.

Alternatively, computer usable program code 416 may be transferred to data processing system 400 from computer readable media 418 through a communications link to communications unit 410 and/or through a connection to input/output unit 412. The communications link and/or the connection may be physical or wireless, in these examples. The computer readable media also may take the form of non-tangible media, such as communications links or wireless transmissions containing the computer readable program code.

The different components illustrated for data processing system 400 are not meant to provide architectural limitations to the manner in which different embodiments may be implemented. The different embodiments may be implemented in a data processing system including components in addition to or in place of those illustrated for data processing system 400. Other components shown in FIG. 4 can be varied from the examples shown.

For example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

Figure 5:
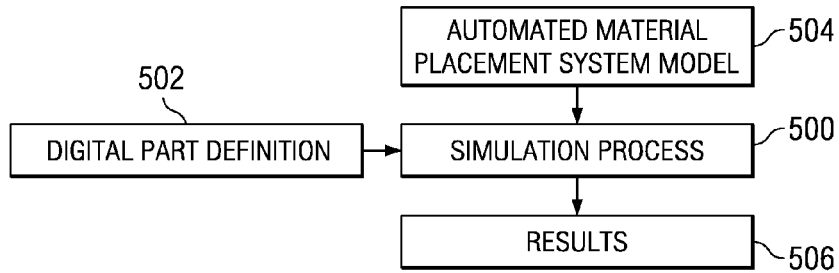
FIG. 5 is a block diagram of components used to simulate production of a composite part in accordance with an advantageous embodiment.

With reference now to FIG. 5, a block diagram of components used to simulate production of a composite part is depicted in accordance with an advantageous embodiment. In this example, simulation process 500 is an example of a process that may be implemented in a data processing system, such as data processing system 400 in FIG. 4. In particular, simulation process 500 is used to simulate the process of laying down tape by an automated material placement system in the form of an automated prepreg lamination machine to create a composite part. In these examples, the tape is composite tape, such as a prepreg tape. Simulation process 500 simulates the lay-down of tape to form the composite part but does not include all the processes, such as curing of the part after the tape has been laid down to form the part. The automated prepreg lamination machine may be, for example, automated material placement system 300 in FIG. 3. Simulation process 500 also may simulate other processes used to create the composite part, such as laying down fabric or mixtures of fabric and tape.

In this example, simulation process 500 receives digital part definition 502. Digital part definition 502 is a design for a composite part. This composite part may be, for example, a wing panel, a flap, an aileron, or any other composite part of interest. Digital part definition 502 may be received from various sources. For example, digital part definition 502 may be a definition created during the design of the part. In these examples, digital part definition 502 is a three dimensional definition. The definition defines the parameters, such as, for example, layers that form the part, plies of composite tape that are in each layer, the orientation of plies, and composite fabrics that may be used in one or more layers of the part.

Alternatively, digital part definition 502 may be derived from various sources to include information needed to specify the different layers in the composite part. For example, digital part definition 502 may be information, such as design data from CATIA Version5 which is available from Dassualt Systems. Of course, digital part definition 502 may be obtained from other sources and types of computer aided design software files.

Simulation process 500 also receives automated material placement system model 504. This model defines various performance parameters for the automated material placement system that is selected for use in creating the composite part. The automated material placement system may include one or more machines that lay-down tape for a composite part.

Further, the performance parameters in these examples are parameters, such as tape width, machine lay up speed, tape head rotating and repositioning time (for bi-direction lay-down processing), tape head re-positioning speed (for uni-direction lay-down processing), acceleration and deceleration factors of gravity for different directions of tape movement, and number of tape heads. Of course, any information that affects the time and speed at which tape is placed or laid-down to create a composite part may be included as a performance parameter within automated material placement system model 504.

In these examples, automated material placement system model 504 may be received in a number of different ways. The information may be received as part of a computer aided design model of the system. Alternatively, the information may be received in other file forms, such as information in a spreadsheet.

With this information, simulation process 500 analyzes each layer of geometry within the composite part. This three-dimensional data used in the simulation may include surface area as well as panel contours or other specifications. The geometric data is placed into courses or layers based on tape width variables. The simulation then generates results 506.

The results in this example present the time needed to lay-down tape for the composite part. From viewing these results, the user may change parameters and rerun simulation process 500 to obtain a new result. Results 506 may take various forms. The results may be merely a display or presentation of the simulation results.

Alternatively, results 506 may take the form of a spreadsheet. In either event, performance variables may be changed, and the simulation may be rerun by simulation process 500 to generate new results to identify changes in the time needed to generate or manufacture a composite part based on a particular automated material placement system.

If results 506 takes the form of a spreadsheet, performance variables may be altered directly in the spreadsheet without requiring rerunning simulation process 500. When a spreadsheet is generated, simulation process 500 simulates the laying down of plies based on tape with each layer. The output course length data is output to the spreadsheet. With the course length data in the spreadsheet and the automated material placement system model, changes may be made to various parameters of the model to identify changes in the time needed to lay-down tape. In these examples, the length of the courses is a function of the width when the layer is not a rectangle. With this information, production planning may be made using the time needed to lay up the composite part. For example, the production of the entire part including curing or finishing may be identified by using the time needed to lay up the part prior to curing. Alternatively, changes in the configuration of the automated prepreg lamination machine may be made to decrease the time needed to lay up the composite part.

Figure 6:
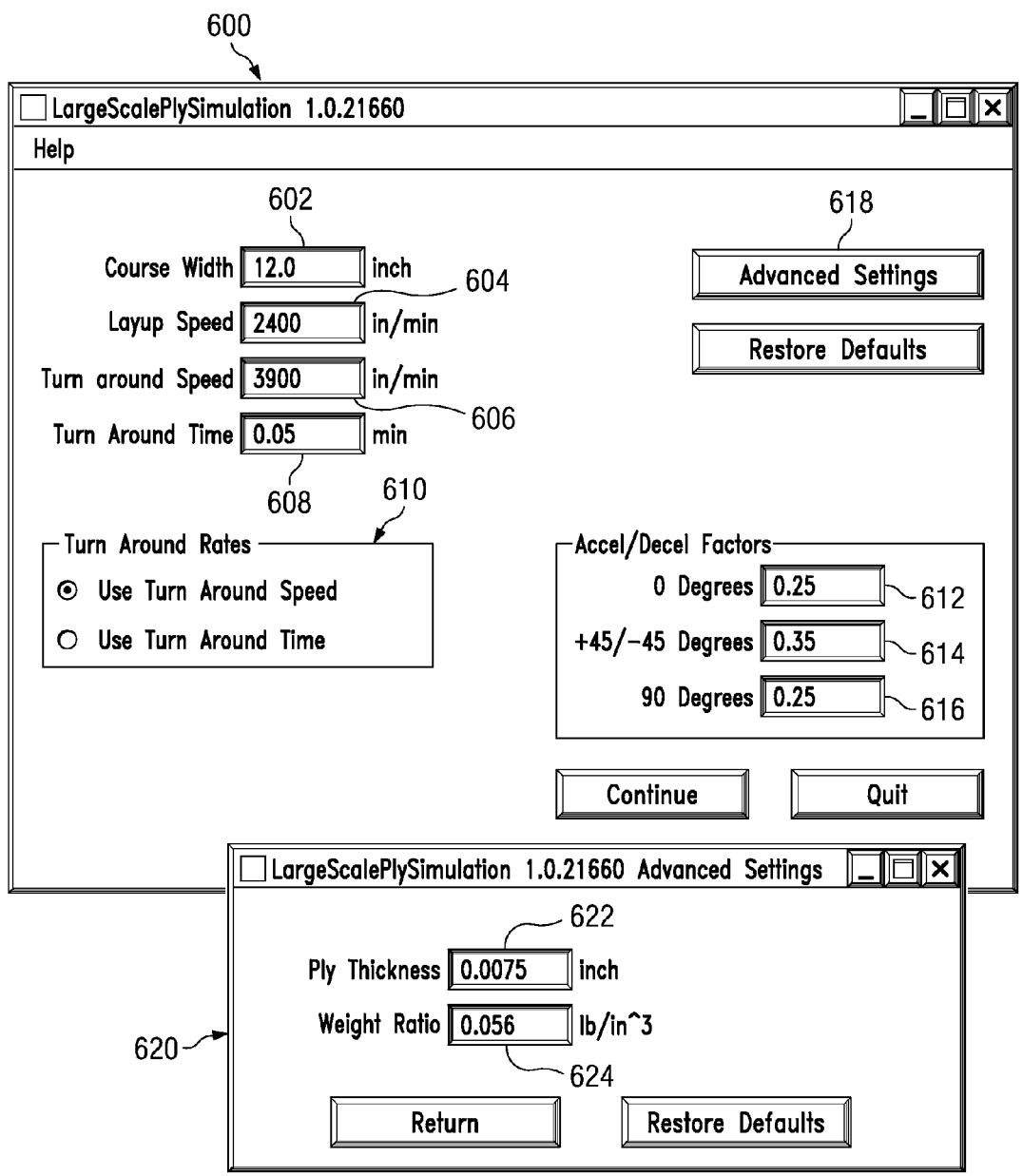
FIG. 6 is a diagram illustrating an example of a user interface that may be used to enter performance parameters for an automated material placement system in accordance with an advantageous embodiment.

Turning now to FIG. 6, a diagram illustrating an example of a user interface that may be used to enter performance parameters for an automated material placement system is depicted in accordance with an advantageous embodiment. In this example, interface 600 is a graphical user interface that may be used to enter performance parameters for an automated material placement system, such as an automated prepreg lamination machine used to place or lay down prepreg tape for a composite part.

As illustrated in these examples, field 602 may be used to enter information, such as the tape width. Field 604 is used to enter tape head lay-down speed, field 606 is used to enter the tape head repositioning speed (most time used for uni-direction lay-down mode), and field 608 is used to enter tape head rotation and positioning time (most time used for bi-direction lay-down mode). Section 610 is option to select one of the modes of field 606 or field 608. The option in section 610 is used to account time for the tape head between two courses. Once a tape head lays down the last ply (course), the tape head has two motion options to start next ply (course). One option is a bi-direction option in which the head is rotating 180 degrees, moves to start point of next ply at end edge of last ply, and then lays down the next ply in an opposite direction of last ply. Another option is a uni-direction option in which the tape head is moved to start point of next ply at same edge of last ply's starting point without rotating head. The next ply is then laid down with same direction as last ply.

Acceleration values for the tape head may be entered in fields 612, 614, and 616 for each of those orientation angles. Additionally, advance setting control 618 may be selected to display pop-up window 620 which allows for additional settings to be made. Pop-up window 620 allows a user to enter ply thickness in field 622 and a weight ratio in field 624.

This information is used to generate the model of the automated material placement system for the simulation. This information is used to simulate the lay-down of tape for a composite part. Of course, the illustrated user interface is provided merely as an example of one manner in which information for a model of the automated prepreg lamination machine may be entered. The example is not meant to limit the manner in which models may be created in the different embodiments.

Turning now to FIG. 7, an example of another mechanism used to enter performance parameters is depicted in accordance with an advantageous embodiment. In this example, table 700 is an example of a spreadsheet that may be used to enter data for an automated prepreg lamination machine. In this example, the data entered relays to gantries, tape heads, and their cost for a system.

In this example, the travel distance in inches is found in the cells for different tape heads for different gantries. A tape head assembly on a gantry must travel past the part edge to lay up a full tape course or width. The tape head assembly overtravels the part edge because the tape heads are offset when heads are placed side-by-side but staggered slightly with respect to each other. The staggering allows for the overlap when multiple tape heads are used.

In these examples, one tape head is typically staggered in front of the other. The number of tape heads in the assembly is used to determine how far the first tape head has to pass by the part edge before the last tape head reaches the part edge. Table 700 illustrates the over-traveled distance in inches based on the applied course direction and machine configuration. In this example, cost estimates are also included for each.

Turning now to FIG. 8, a diagram illustrating results is depicted in accordance with an advantageous embodiment. In this particular example, the results are presented in chart 800. These results are examples of results, such as results 506 in FIG. 5. In this particular example, section 802 provides information from actual production data.

The results, in these examples, includes head travel in row 804, process time in row 806, tape weight in row 808, production rate in row 810, time difference in row 812, and production rate difference in row 814. In these examples, the simulation results include head travel length with lay up speed in column 816. The result for different speeds with respect to the speed at which tape is laid down is shown in columns 818, 820, and 822. In this example, the simulation result provides comparison to the actual production data from an actual automated material placement system that includes an automated prepreg lamination machine.

Figure 9:
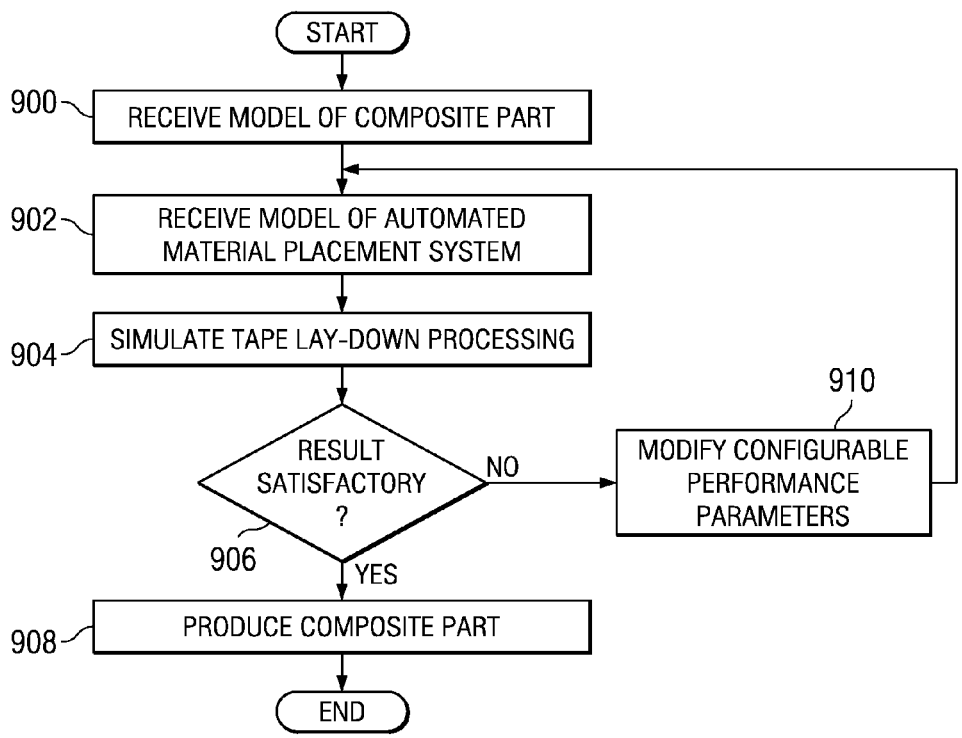
FIG. 9 is a flowchart of a process for managing production of a composite part in accordance with an advantageous embodiment.

Turning now to FIG. 9, a flowchart of a process for managing production of a composite part is depicted in accordance with an advantageous embodiment. The process begins by receiving a model of the composite part (operation 900). In these examples, the model is a digital part definition that may have been generated during the design of the part. Next, a model of the automated material placement system is received (operation 902). This model includes performance parameters needed to simulate the lay-down of tape to manufacture or produce the composite part.

Thereafter, the simulation of the tape lay-down processing is performed (operation 904). This simulation is used to identify the time needed to lay-down tape to produce the composite part.

After the simulation generates results, a determination is made as to whether the result is satisfactory (operation 906). This determination may be made in a number of different ways. For example, if the time needed to lay-down the tape for the composite part is greater than some desired time needed to meet a production schedule, then the result may not be satisfactory. If production schedules are being generated and particular times are not important, this initial time may be used as part of the process of generating the initial production schedule. If the result of the simulation is satisfactory, the composite part is produced (operation 908) with the process terminating thereafter.

On the other hand, if the result is not satisfactory, then the process modifies configurable performance parameters (operation 910). Modifiable configurable performance parameters are ones that may be changed with respect to the automated material placement system. For example, the type of tape, the tape width, and the number of tape heads are examples of parameters that may be changed or modified.

In these examples, many performance parameters are based on machine design configurations. If the system reaches highest performance but still does not satisfy manufacturing desired output, then machine configurations may be modified or another machine may be added to the system. The number and type of machines used in an automated material placement system, in these examples, is considered a configurable performance parameter. The number of machines may be increased. Thereafter, the process returns to operation 902 to receive the new model of the automated material placement system and to rerun the simulation.

Figure 10:
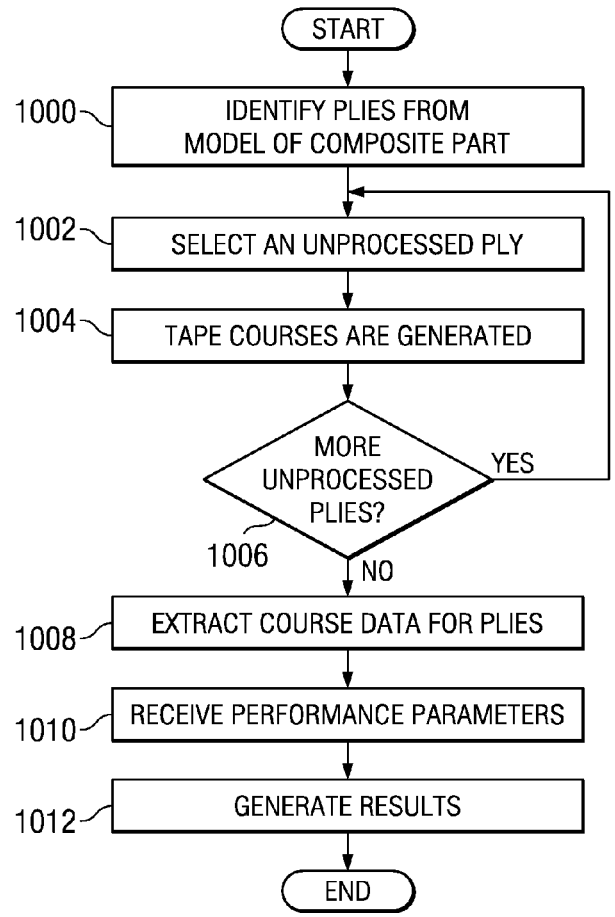
FIG. 10 is a flowchart of a process for performing a simulation of a tape lay-down to form a composite part in accordance with an advantageous embodiment.

With reference now to FIG. 10, a flowchart of a process for performing a simulation of a tape lay-down to form a composite part is depicted in accordance with an advantageous embodiment. The process illustrated in FIG. 10 is a more detailed illustration of operation 904 in FIG. 9.

The process begins by identifying plies from the model of the composite part (operation 1000). Operation 1000 is used to identify the different layers or plies that form the composite part. In other words, a ply is a layer made up of courses of tape in these examples. The course width is the same as the width of the composite tape, in these examples. If the layer is a tape layer, tape is laid down over the tool in a manner to create the layer or ply. This identification includes a common surface from which the plies are split as well as a periphery of each ply. Further, ply direction is identified for each ply that is laid down on the composite part. With this information, the process selects an unprocessed ply (operation 1002). Next, tape courses are generated for the ply (operation 1004).

Thereafter, a determination is made as to whether additional unprocessed plies are present (operation 1006). If additional unprocessed plies are present, the process returns to operation 1002 to obtain another ply for processing.

Otherwise, course data for the plies are extracted (operation 1008). Performance parameters are then received (operation 1010). As described above, these performance parameters are the different parameters used by an automated material placement system to lay-down tape to form a composite part.

The process then generates results (operation 1012). This simulation process could be a unit cost tool for different systems in a research and development period. When unit cost is identified, the results may include the processing weight of composite material per hour of capital investment as an example. These results identify the time needed to create the composite part based on the design model of the composite part in the performance parameters for the automated material placement system used to lay-down tape for the composite part. Operation 1012 may involve generating a spreadsheet that may include changeable variables with respect to performance parameters. This type of result allows a user to change different performance parameters and see how the changes affect the time needed to lay-down a composite part. Further, other information included in these results may be, for example, costs for producing parts with different systems.

Alternatively, the user may be presented with the results on a display in which the user may change variables on the display to change the results. The process terminates thereafter. The results may indicate which automated material placement system is best for a project or production line based on production rate and cost ratio.

Thus, the different advantageous embodiments provide a computer implemented method, apparatus, and computer usable program code for managing production of a composite part. As illustrated in one or more of the different advantageous embodiments, a digital part definition is received for the composite part. Layers are generated for the composite part using this digital definition with respect to performance parameter variables for an automated material placement system. The time needed to form the plurality of layers for the composite part is identified. With this information, the production of the composite part may be managed using the result.

The different advantageous embodiments can take the form of an entirely hardware embodiment, an entirely software embodiment or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description and is not intended to be exhaustive or limited to the invention in the form disclosed. Many modifications and variations will be apparent to those of ordinary skill in the art. In these examples, the different embodiments are illustrated with respect to the laying down of tape and forming a composite part. As described above, other advantageous embodiments the process may include in addition to or in place of the lay-down of tape the placing of fabric or other composite materials to form a composite part.

Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A computer implemented method, comprising:

receiving, at a computer running a simulation process, a digital part definition for a composite part and a model of an automated material placement system for creating the composite part;

responsive to receiving the digital part definition, analyzing, by a processor of the computer, the digital part definition, including one or more surface areas and one or more panel contours;

entering a set of performance variables into a graphical user interface of the computer, the set of performance variables comprising a tape width, a tape head lay-down, one of a tape head rotation and repositioning speed and a tape head repositioning speed, a ply thickness, a weight ratio, and an acceleration value for each of a plurality of tape head orientation angles;

responsive to analyzing the digital part definition, simulating generation of a plurality of layers for creating the composite part using the digital part definition with respect to the set of performance variables for the model of the automated material placement system;

calculating a plurality of times needed to form, in the model of the automated material placement system, the plurality of layers for the composite part at a plurality of layup speeds and selecting a time from the plurality of times; and managing an actual production of the composite part using the selected time from the simulation process.

2. The computer implemented method of claim 1, wherein the simulating generation step comprises:

simulating generation of surfaces and boundaries of materials for the plurality of layers for the composite part.

3. The computer implemented method of claim 1 further comprising:

repeating the simulating generation and calculating steps with different performance variables for the model of the automated material placement system, wherein multiple results are generated for use in managing the production of the composite part.

4. The computer implemented method of claim 1, wherein the set of performance variables includes a configuration of the model of the automated material placement system and wherein the managing step further comprises:

altering the configuration of the model of the automated material placement system to reduce the time needed to produce the composite part.

5. The computer implemented method of claim 4, wherein the set of performance variables includes a number of heads and wherein the altering step comprises:

adding a second head to the model of the automated material placement system to reduce the time needed to produce the composite part.

6. The computer implemented method of claim 1, wherein the set of performance variables includes a number of automated material placement machines in the model of the automated material placement system and wherein the managing step comprises:

increasing the number of automated material placement machines in the model of the automated material placement system to reduce the time needed to produce the composite part.

7. The computer implemented method of claim 1, wherein the set of performance variables includes a type of tape and wherein the managing step comprises:

changing the type of tape used by the model of the automated material placement system to reduce the time needed to produce the composite part.

8. The computer implemented method of claim 3, wherein the multiple results include a cost ratio for a production rate.

9. The computer implemented method of claim 1, wherein the model of the automated material placement system comprises a machine that places prepreg tape and a machine that places fabric to form the composite part.

10. A computer program product comprising:

a computer usable medium having a plurality of computer usable program code, for simulating production of a composite part, stored in the computer usable medium, the computer program product comprising:

computer usable program code for receiving a digital part definition for the composite part and a model of an automated material placement system for creating the composite part;

computer usable program code, responsive to receiving the digital part definition, for analyzing the digital part definition, including one or more surface areas and one or more panel contours;

computer usable program code for displaying a graphical user interface and receiving a set of performance variables at the graphical user interface, the set of performance variables comprising a tape width, a tape head lay-down, one of a tape head rotation and repositioning speed and a tape head repositioning speed, a ply thickness, a weight ratio, and an acceleration value for each of a plurality of tape head orientation angles;

computer usable program code, responsive to analyzing the digital part definition, for simulating generation of a plurality of layers for the formation of the composite part using the digital part definition with respect to the set of performance variables for the model of the automated material placement system;

computer usable program code for calculating a plurality of times needed to form the plurality of layers for the composite part to format a plurality of layup speeds and selecting a time from the plurality of times; and computer usable program code for managing an actual production of the composite part using the selected time.

11. The computer program product of claim 10, wherein the computer usable program code for simulating generation of the plurality of layers for the composite part using the digital part definition with respect to the set of performance variables for the model of the automated material placement system comprises:

computer usable program code for simulating generation of surfaces and boundaries of materials for the plurality of layers for the composite part.

12. The computer program product of claim 10 further comprising:

computer usable program code for repeating execution of the computer usable program code for simulating generation of the plurality of layers for the composite part using the digital part definition with respect to the set of performance variables for the model of the automated material placement system and the computer usable program code for calculating the time needed to form the plurality of layers for the composite part to form the result with different performance variables for the automated material placement system, wherein multiple results are generated for use in managing the production of the composite part.

13. The computer program product of claim 10, wherein the set of performance variables includes a configuration of the model of the automated material placement system and wherein the computer usable program code for managing the production of the composite part using the result comprises:

computer usable program code for altering the configuration of the model of the automated material placement system to reduce the time needed to produce the composite part.

14. The computer program product of claim 13, wherein the set of performance variables includes a number of heads and wherein the computer usable program code for altering the configuration of the model of the automated material placement system to reduce the time needed to produce the composite part comprises:

computer usable program code for adding a second head to the model of the automated material placement system to reduce the time needed to produce the composite part.

15. The computer program product of claim 10, wherein the set of performance variables includes a number of automated material placement machines in the model of the automated material placement system and wherein the computer usable program code for managing the production of the composite part using the result comprises:

computer usable program code for increasing the number of automated material placement machines in the model of the automated material placement system to reduce the time needed to produce the composite part.

16. The computer program product of claim 10, wherein the set of performance variables includes a type of tape and wherein the computer usable program code for managing the production of the composite part using the result comprises:

computer usable program code for changing the type of tape used by the model of the automated material placement system to reduce the time needed to produce the composite part.

17. A data processing system comprising:
a bus;
a communications unit connected to the bus;
a storage device connected to the bus;

a plurality of computer usable program code stored in the storage device;

a processor unit connected to the bus, wherein the processor unit executes the computer usable program code to run a simulation process and a model of an automated material placement system for creating a composite part; receive a digital part definition for the composite part; responsive to receiving the digital part definition, analyze the digital part definition including one or more surface areas and one or more panel contours; display a graphical user interface and receive at the graphical user interface a set of performance variables, the set of performance variables comprising a tape width, a tape head lay-down, one of a tape head rotation and repositioning speed and a tape head repositioning speed, a ply thickness, a weight ratio, and an acceleration value for each of a plurality of tape head orientation angles; responsive to analyzing the digital part definition, simulate generation of a plurality of layers for the composite part using the digital part definition with respect to the set of performance variables for the model of the automated material placement system; calculate a plurality of times needed to form, in the model of the automated material placement system, the plurality of layers for the composite part at a plurality of layup speeds and select a time from the plurality of times; and manage an actual production of the composite part using the selected time.

18. The data processing system of claim 17, wherein in executing the computer usable program code to simulate generation of the plurality of layers for the composite part using the digital part definition with respect to the set of performance variables for the model of the automated material placement system, the processor unit executes the computer usable program code to simulate generation of surfaces and boundaries of materials for the plurality of layers for the composite part.

19. The data processing system of claim 17, wherein the processor unit further executes the computer usable program code to simulate generation of the plurality of layers for the composite part using the digital part definition and the set of performance variables for the model of the automated material placement system and calculate and select another time needed to form the plurality of layers for the composite part to form a result of the simulation process with different performance variables for the model of the automated material placement system, whereby multiple simulation results are generated for use in managing the production of the composite part.

20. The data processing system of claim 17, wherein the set of performance variables includes a configuration of the model of the automated material placement system and wherein in executing the computer usable program code to manage the production of the composite part using a result of the process simulation, the processor unit executes the computer usable program code to alter the configuration of the model of the automated material placement system to reduce the time needed to produce the composite part.

21. The data processing system of claim 20, wherein the set of performance variables includes a number of heads and wherein in executing the computer usable program code to alter the configuration of the model of the automated material placement system to reduce the time needed to produce the composite part, the processor unit executes the computer usable program code to add a second head to the model of the automated material placement system to reduce the time needed to produce the composite part.

22. The data processing system of claim 17, wherein the set of performance variables includes a number of automated material placement machines in the model of the automated material placement system and wherein in executing the computer usable program code to manage the production of the composite part using a result of the simulation process, the processor unit executes the computer usable program code to increase the number of automated material placement machines in the model of the automated material placement system to reduce the time needed to produce the composite part.

* * * * *